US010558701B2

(12) United States Patent
He et al.

(10) Patent No.: US 10,558,701 B2
(45) Date of Patent: Feb. 11, 2020

(54) METHOD AND SYSTEM TO RECOMMEND IMAGES IN A SOCIAL APPLICATION

(71) Applicant: International Business Machines Corporation, Armonk, NY (US)

(72) Inventors: Jin Long L L He, Shanghai (CN); Yu Hong Y L Li, Shanghai (CN); Xiao Rui Shao, Shanghai (CN); Fei F. Shen, Shanghai (CN); Jian Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/427,462

(22) Filed: Feb. 8, 2017

(65) Prior Publication Data

US 2018/0225306 A1 Aug. 9, 2018

(51) Int. Cl.
G06F 17/30 (2006.01)
*G06F 16/50* (2019.01)
*G10L 15/26* (2006.01)
G06Q 50/00 (2012.01)

(52) U.S. Cl.
CPC .............. *G06F 16/50* (2019.01); *G06Q 50/01* (2013.01); *G10L 15/26* (2013.01)

(58) Field of Classification Search
CPC ...................................................... G06F 17/30
USPC ........................................................ 707/759
See application file for complete search history.

(56) References Cited

U.S. PATENT DOCUMENTS 6,317,716 B1* 11/2001 Braida ................. G09B 21/009
704/270
6,975,988 B1* 12/2005 Roth .................... G06Q 10/107
345/184
7,451,090 B2* 11/2008 Nakagawa ............. G06F 16/58
704/275

(Continued)

FOREIGN PATENT DOCUMENTS

WO 2015119605 A1 8/2015

OTHER PUBLICATIONS

Woods, Ben, "Facebook Messenger testing voice-to-text conversions", http://thenextweb.com/facebook/2015/01/19/facebook-messenger-testing-voice-text-conversions/, Jan. 19, 2015, 5 pgs.

*Primary Examiner* — Kim T Nguyen
(74) *Attorney, Agent, or Firm* — William H. Hartwell; Maxine L. Barasch; Keohane & D'Alessandro PLLC

(57) ABSTRACT

Disclosed embodiments provide techniques for suggesting images that can be conveniently included in electronic communication such as social media posts, emails, text messages, and other forms of electronic communication, based on voice input and/or emotion analysis from facial expressions of a user. A speech-to-text process converts a user's spoken utterance to text. Natural language processing performs an entity extraction on the utterance to generate a scenario summary. An image database is queried using the scenario summary and/or emotion analysis based on user facial images. A mapping rule library may be used to perform the image database query. Based on the scenario summary and/or the emotion analysis, images are presented to the user as recommended for including in an electronic communication message such as a social media post, email, or text message.

20 Claims, 10 Drawing Sheets

(56) References Cited

U.S. PATENT DOCUMENTS

| | | | | |
|---|---|---|---|---|
| 7,676,369 B2* | 3/2010 | Fujimoto | ............... | G10L 15/22 |
| | | | | 704/231 |
| 8,731,339 B2* | 5/2014 | Chan | ...................... | G06K 9/20 |
| | | | | 382/312 |
| 8,838,505 B2* | 9/2014 | Jang | ..................... | G06Q 10/10 |
| | | | | 706/12 |
| 9,075,812 B1 | 7/2015 | Heyward et al. | | |
| 9,263,047 B2 | 2/2016 | Chang et al. | | |
| 9,384,288 B2 | 7/2016 | Heyward et al. | | |
| 9,442,693 B2* | 9/2016 | Dykstra-Erickson | ....................... | |
| | | | | G06F 3/167 |
| 9,854,393 B2* | 12/2017 | Moussavian | ........... | H04L 43/08 |
| 10,019,653 B2* | 7/2018 | Wilf | .................. | G06K 9/00302 |
| 10,414,347 B2* | 9/2019 | Wilbert | ................. | B60Q 5/005 |
| 2014/0136196 A1 | 5/2014 | Wu et al. | | |

* cited by examiner

US 10,558,701 B2

METHOD AND SYSTEM TO RECOMMEND IMAGES IN A SOCIAL APPLICATION

FIELD OF THE INVENTION

The present invention relates to recommendation of images in a social application.

BACKGROUND

Electronic communication is a common form of interaction for many people. The use of electronic communication allows people to interact in different ways and utilize many forms of media in the process. Electronic communication makes it easy to interact with groups through chat interfaces or video conferencing. Companies use electronic communications to enhance their business and avoid obstacles, such as long-distance communication with their clients or partners.

In recent years, a variety of technological trends have caused the amount of electronic communication to dramatically increase. Smart, Internet-enabled devices such as smartphones, tablet computers, and wearable technology have enabled users to communicate almost anywhere. Additionally, social media sites such as Facebook® and Twitter® have greatly increased the amount of online image content with an associated text description. A user typically has many available images from which to choose when composing an electronic communication. Social media sites facilitate one-to-many communication, as well as communication between two individuals, and/or amongst a group of individuals. As a result, their use has gained popularity over recent years. It is therefore desirable to have improvements in electronic communication for social applications.

SUMMARY

In one aspect, there is provided a computer-implemented method for recommending images for inclusion in an electronic message, comprising: receiving an uttered phrase from a client device via a computer network at an analysis server comprising a processor and a memory that stores instructions for the processor, wherein the processor: performs a speech-to-text process on the uttered phrase; performs an entity detection process to generate a scenario summary; performs a query of an image database using the scenario summary as an input to the query to obtain one or more images; and presents the one or more images to a user as available for inclusion in the electronic message.

In another aspect, there is provided a computer system comprising: a processor; a memory coupled to the processor, the memory containing instructions, that when executed by the processor, perform the steps of: receiving an uttered phrase from a client device via a computer network; performing a speech-to-text process on the uttered phrase; performing an entity detection process to generate a scenario summary; performing a query of an image database using the scenario summary as an input to the query to obtain one or more images; and providing the one or more images to a user as available for inclusion in an electronic message.

In yet another aspect, there is provided a computer program product for recommending images for inclusion in an electronic message comprising a computer readable storage medium having program instructions embodied therewith, the program instructions executable by a processor to cause the electronic device to: receive an uttered phrase from a client device via a computer network; perform a speech-to-text process on the uttered phrase; perform an entity detection process to generate a scenario summary; perform a query of an image database using the scenario summary as an input to the query to obtain one or more images; and provide the one or more images to a user as available for inclusion in the electronic message.

BRIEF DESCRIPTION OF THE DRAWINGS

Features of the disclosed embodiments will be more readily understood from the following detailed description of the various aspects of the invention taken in conjunction with the accompanying drawings.

Figure 1:
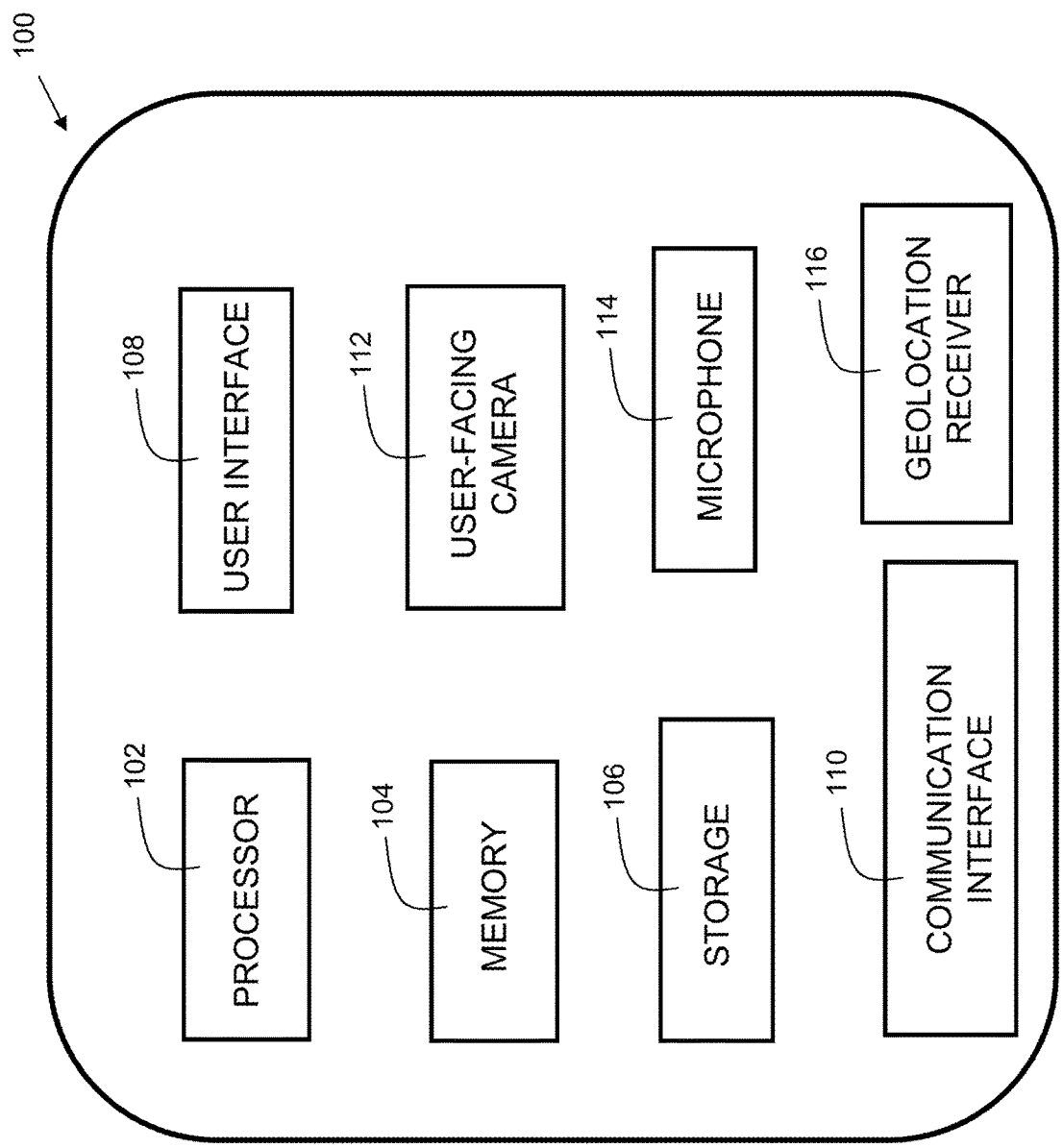
FIG. 1 shows a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for suggesting images that can be conveniently included in electronic communication such as social media posts, emails, text messages, and other forms of electronic communication, based on voice input and/or emotion analysis from facial expressions of a user. A speech-to-text process converts a user's spoken utterance to text. Natural language processing performs an entity extraction on the utterance to generate a scenario summary. An image database is queried using the scenario summary and/or emotion analysis based on user facial images. A mapping rule library may be used to perform the image database query. Based on the scenario summary and/or the emotion analysis, images are presented to the user as recommended for including in an electronic communication message such as a social media post, email, or text message.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of a device in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of the present invention.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 further includes a user interface 108, examples of which include a liquid crystal display (LCD), a plasma display, a cathode ray tube (CRT) display, a light emitting diode (LED) display, an organic LED (OLED) display, or other suitable display technology. The user interface 108 may further include a keyboard, mouse, and/or a touch screen, incorporating a capacitive or resistive touch screen in some embodiments.

The device 100 further includes a communication interface 110. In some embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network.

The device 100 further includes a user-facing camera 112. Camera 112 can be a visual camera, IR, or other suitable environment detection device. The camera may include a flash for supplying light.

The device yet further includes a microphone 114. The microphone captures sound for further processing by device 100.

The device includes a geolocation receiver 116. Geolocation receiver 116 may be any type of location-detecting system. For example, it may include a global positioning system, triangulation system, or other suitable technology.

Figure 2:
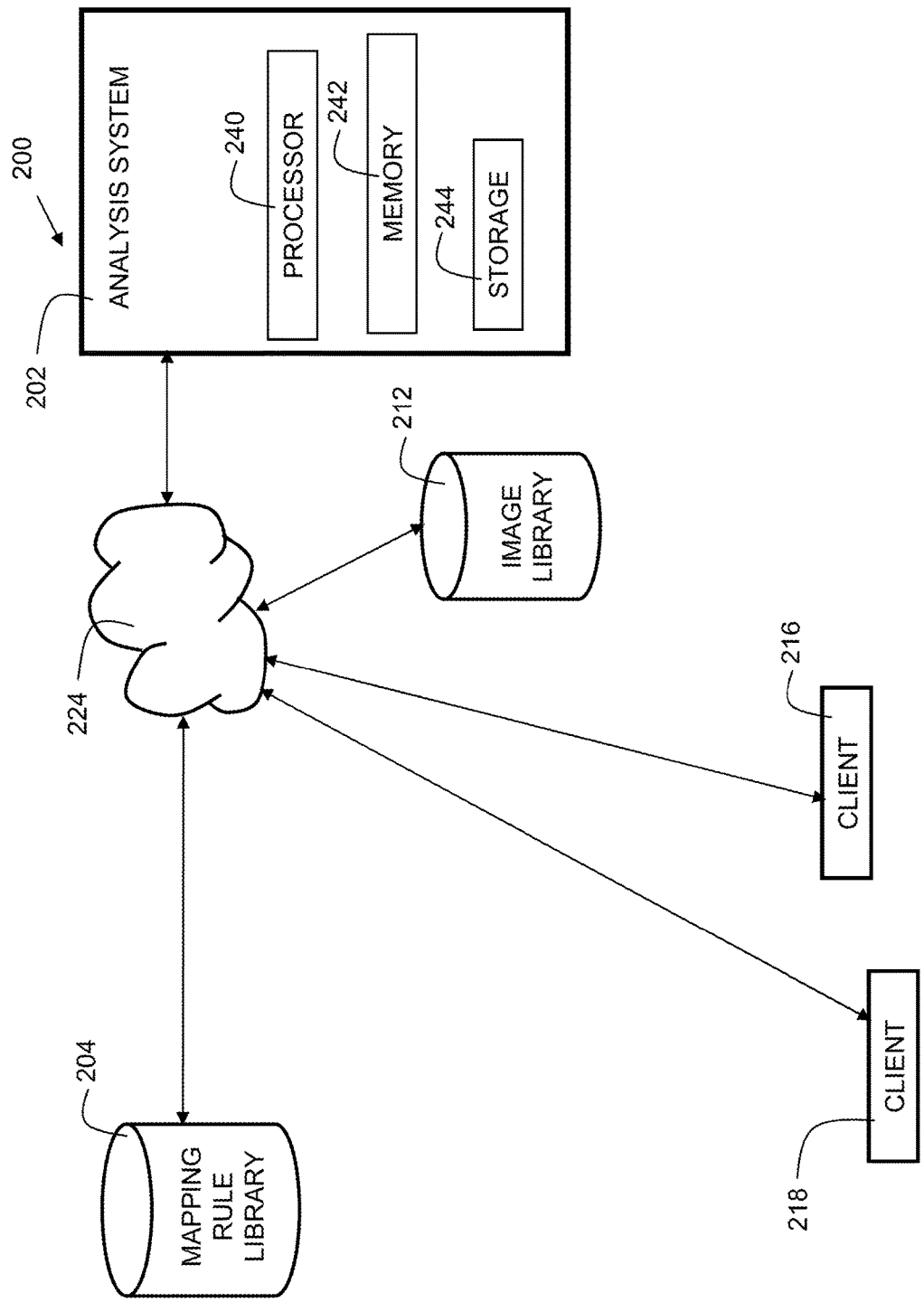
FIG. 2 shows an environment for implementation of embodiments of the present invention.

FIG. 2 shows an environment 200 for implementation of embodiments of the invention. An analysis system 202 includes a processor 240, memory 242, and storage 244. Analysis system 202 includes instructions stored in memory 242 for executing elements of embodiments of the present invention. System 202 is in communication with mapping rule library 204, image library 212, and client devices 216 and 218 through network 224. In embodiments, network 224 may be the Internet, a wide area network (WAN), a local area network (LAN), cloud computing network, or other suitable network. Mapping rule library 204 includes rules and associated keywords for images. Image library 212 stores images for suggestion. Note that in other embodiments, the images may also, or instead, be stored on client device(s). Client devices may be any suitable electronic devices. Examples include smartphones, tablet computers, laptop computers, desktop computers, etc.

Figure 3:
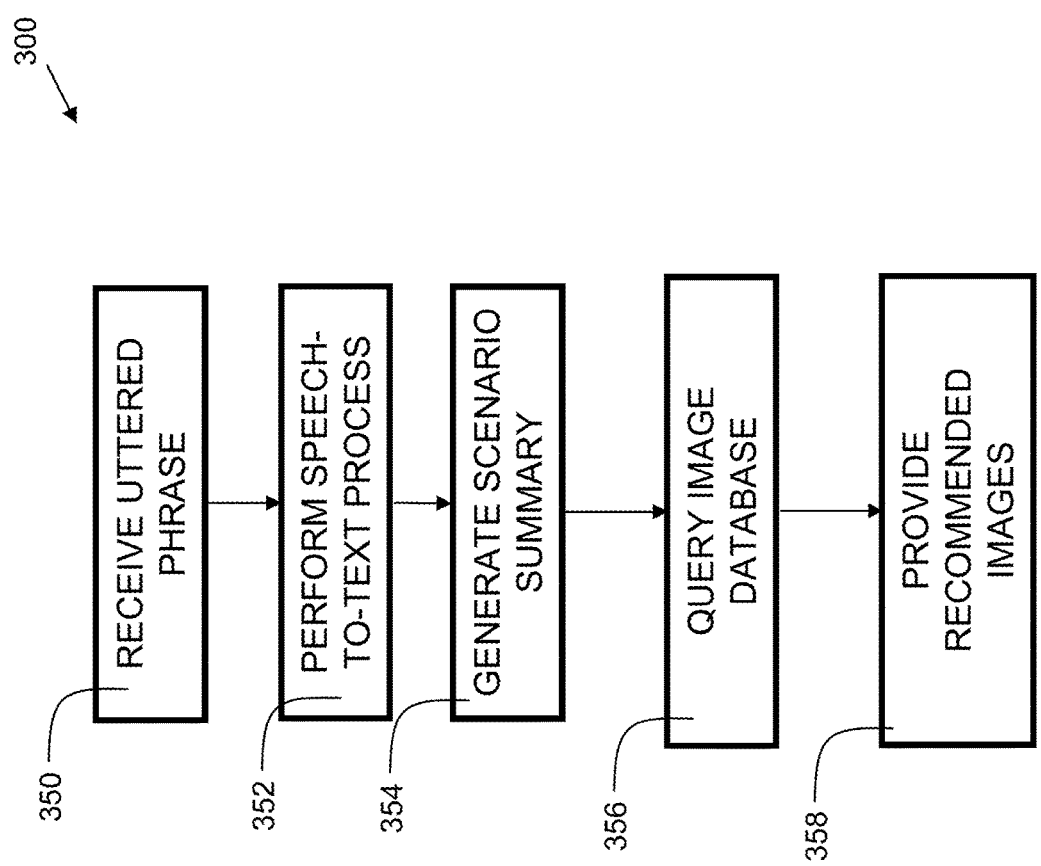
FIG. 3 is a flowchart indicating process steps for an embodiment of the present invention.

FIG. 3 is a flowchart 300 indicating process steps for some embodiments of the present invention. At block 350, an uttered phrase is received from a client device via a computer network at an analysis server. The uttered phrase may be received in the form of a sound representation such as PCM (Pulse Code Modulated) data, a WAV file, MP3 file, or other suitable audio format. At block 352, a speech-to-text process is performed on the uttered phrase. The speech-to-text process may include transmitting the audio data (e.g., PCM data or compressed audio data) to the analysis system. The analysis system may then perform a phoneme extraction process to extract the phonemes from the audio data. In the English language, there are 44 phonemes. Other languages may have more or fewer phonemes. For example, Spanish has 24 phonemes, while German has 45 phonemes. A variety of tools, such as CMU Sphinx, are available for performing phoneme extraction. While the examples disclosed herein use examples in English, disclosed embodiments can be adapted to operate with a variety of languages, including, but not limited to, Spanish, French, Italian, German, Portuguese, Japanese, Chinese, or Russian.

The speech-to-text process may further perform a homonym disambiguation process. For example, some words are pronounced the same way, such as eight and ate. The homonym disambiguation process may use tokenization and part-of-speech identification to determine the most likely word that matches the phonemes. For example, if a preposition precedes a phoneme that sounds like "eight,", then the intended word is most likely to be "ate."

The speech-to-text process may further consider dialects within a language. For example, in English, there are a variety of dialects (e.g., British, American, Canadian, and Australian English) which may each have a slightly different lexicon. The speech-to-text process may use the dialect in computing the probability of a phoneme or set of phonemes matching a particular word.

At block 354, a scenario summary is generated. An entity detection process is performed to generate a scenario summary. The entity detection can include extraction, which is the detection and preparation of named entity occurrences. The extraction phase includes POS (part of speech) tagging, tokenization, sentence boundary detection, capitalization rules and in-document statistics. The entity detection can further include noun identification, followed by identifying a subset of nouns including proper nouns, and nouns deemed to be topically pertinent. The extracted entities can be used as keywords within the scenario summary.

In some embodiments, the scenario summary comprises an emotion attribute. The emotion attribute may be computed by performing a natural language processing sentiment analysis via a computerized device. In some embodiments, a polarity database is used to assess a sentiment and/or emotion attribute. In some embodiments, the emotion attribute includes an emotion of joy, sadness, frustration, anger, boredom, or relief. At block 356, an image database is queried. A query of an image database, using the scenario summary as an input to the query, is performed to obtain one or more relevant images. In embodiments, the scenario summary is input to a mapping rule library, which then retrieves suggested images. At block 358, one or more relevant images are provided to a user as available for inclusion in an electronic message. The images may be provided to the user via a user interface where the user can select (e.g., by clicking with a mouse or touching a touchscreen) a thumbnail of the one or more images for inclusion in an electronic communication.

Figure 4:
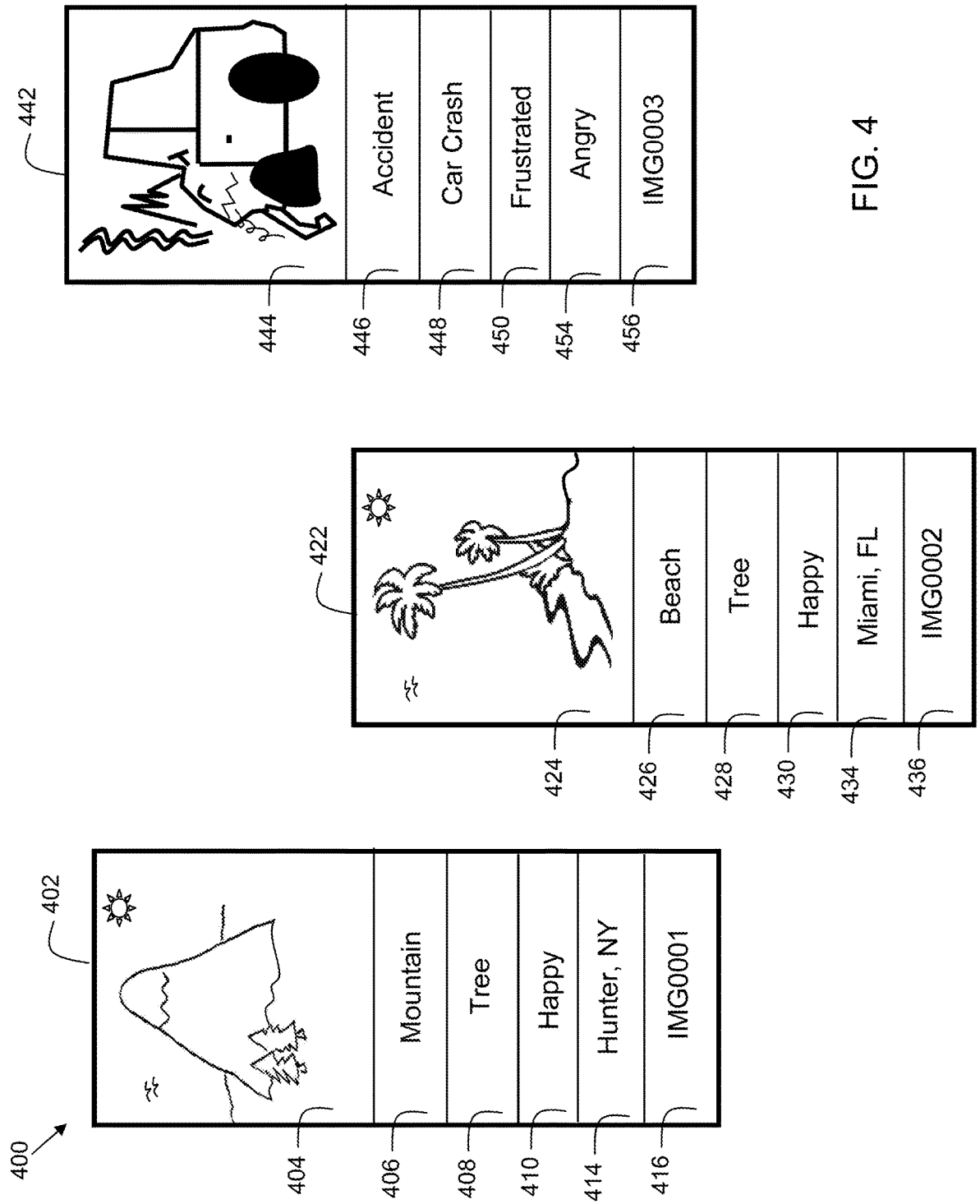
FIG. 4 shows details of an example image library used with embodiments of the present invention.

FIG. 4 shows details of an example 400 of an image library used with embodiments of the present invention. In the example, there are three database tables. Each database table includes an image, as well as associated metadata.

A first table 402 includes an image 404 of a mountain scene. Metadata associated with the mountain scene includes "Mountain" 406 and "Tree" 408, both items detected in the scene. In embodiments, a computer-implemented image detection process is used to identify one or more objects within an image. The image detection process may include edge detection, gradient processing, noise filtering, color analysis, and other suitable techniques to identify shapes. The identified shapes may then be compared with training data for known objects, and objects with similar shapes may be associated with the image. Machine learning with image classifiers may be used as part of the object recognition process. This enables a computerized generation of metadata for the image.

Metadata further includes "Happy" 410, an emotion associated with the scene. The emotion may be associated with the image by natural language processing analysis of an associated text description of the image. The natural language processing can include entity detection, sentiment analysis, emoticon analysis, and/or other suitable techniques. The metadata may further include a location 414 where the image was acquired. It can be by city, state, country, country name, or by latitude and longitude coordinates, etc. The metadata yet further includes an image identifier 416 for retrieving the image file in storage.

A second table 422 includes an image 424 of a beach scene. Metadata associated with the beach scene includes "Beach" 426 and "Tree" 428, both items detected in the scene. Metadata further includes "Happy" 430, an emotion associated with the scene. The metadata may further include a location 434 where the image was acquired. Metadata yet further includes an image identifier 436 for retrieving the image in storage.

A third table 442 includes an image 444 of a car crash scene. Metadata associated with the car crash scene includes "Accident" 446 and "Car Crash" 448, both items detected in the scene. Metadata further includes "Frustrated" 450 and "Angry" 454, emotions associated with the scene. Metadata yet further includes an image identifier 456 for retrieving the image in storage.

Figure 5:
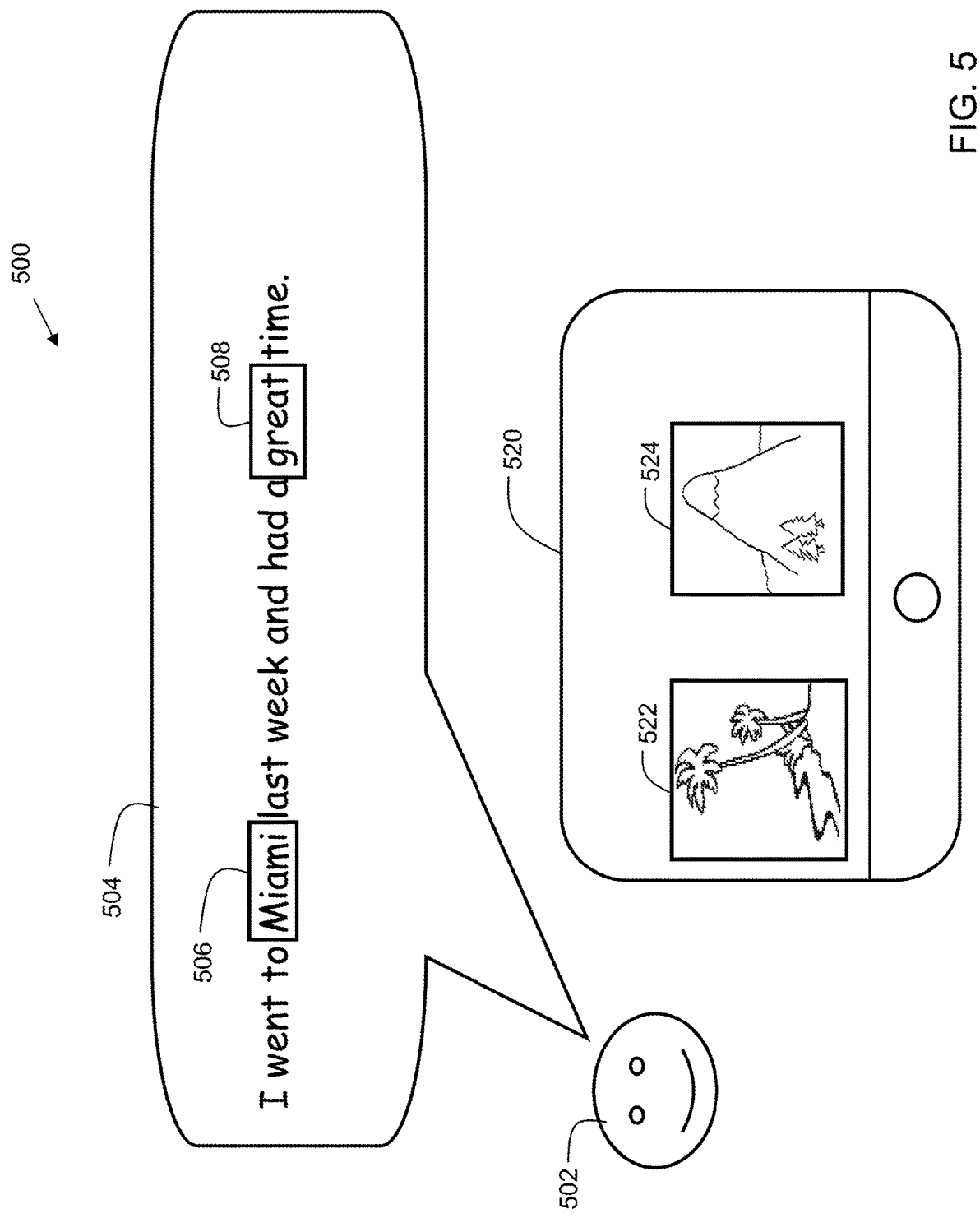
FIG. 5 shows a usage example of an embodiment of the present invention.

FIG. 5 shows a usage example 500 of an embodiment of the present invention. A user 502 speaks into a user device, such as device 100 (FIG. 1). In the example, the user 502 speaks into a microphone 114 (FIG. 1) of device 100. The user 502 utters speech fragment 504: "I went to Miami last week and had a great time." Embodiments of the invention perform a speech-to-text process to generate a text phrase. Embodiments may then further process the text phrase to extract entities, such as keywords or recognized phrases, from the text phrase. Images having metadata matching, or similar to, the extracted entities are fetched and suggested to the user on the user's device screen 520. In the example, the words, "Miami" 506 and "great" 508 are extracted from the speech fragment. Miami is associated with a beach, and so an image 522 of a beach is suggested.

In some embodiments, facial analysis is used for suggesting images. Embodiments can include receiving a face image of the user from the client device via the computer network at the analysis server. The processor performs an emotion analysis on the face image. The performing a query of an image database further comprises using the emotion analysis as an input to the query to obtain the one or more relevant images.

In some embodiments, performing an emotion analysis comprises identifying one or more action units in the face image. The Facial Action Coding System (FACS) is a system to classify human facial movements by their appearance on the face. Movements of individual facial muscles are encoded by FACS from slight different instant changes in facial appearance. Using FACS, a computerized method can analyze a wide variety of anatomically possible facial expressions, deconstructing them into the specific Action Units (AU).

Using action units, the mood or sentiment of the author of an electronic communication may be inferred if a user-facing camera captures images of the user as he/she is composing the electronic communication. For example, AU12 (Lip Corner Puller) is associated with movement of the zygomaticus muscles during a smile. AU02 (Outer Brow Raiser) is associated with movement of the frontalis muscles during a look of surprise. A variety of action units may be combined to infer a given facial expression. Thus, as a user speaks into his/her electronic communication device (e.g. smartphone), the user-facing camera on the device can acquire one or more images of the user, perform an action unit (AU) identification process, and infer a mood of the user as the electronic communication is being composed. Images are then recommended for inclusion, based at least in part, on the inferred mood of the user.

In the example, the user device 100 may be configured such that the user is looking at the user-facing camera 112 while speaking into a built-in microphone 114. Alternatively, s/he could be speaking into a microphone remote from the user device, for example, the microphone of a headset plugged into a jack on the phone. Embodiments, using user-facing camera 112 (FIG. 1), detect facial expressions of the user while s/he is speaking. The detection of facial expressions can involve detection of one or more action units (AUs). From the facial expressions, embodiments associate emotion metadata with the fragment of speech. In the example, image 524 of the mountain scene is suggested since "great" is similar to "happy" (stored in a database as related to one another), and the image 524 has "happy" as associated metadata.

Embodiments may include receiving a location of the user from the client device via the computer network at the analysis server. A query of an image database may further include using the location as an input to the query to obtain the one or more relevant images. The location of the user while speaking into the device 100 may be determined by geolocation receiver 116, and sent to the analyzer. In the example, the geolocation receiver may determine that the user is at Miami Beach, which causes embodiments to prioritize beach images, like 522, for suggestion.

Figure 6:
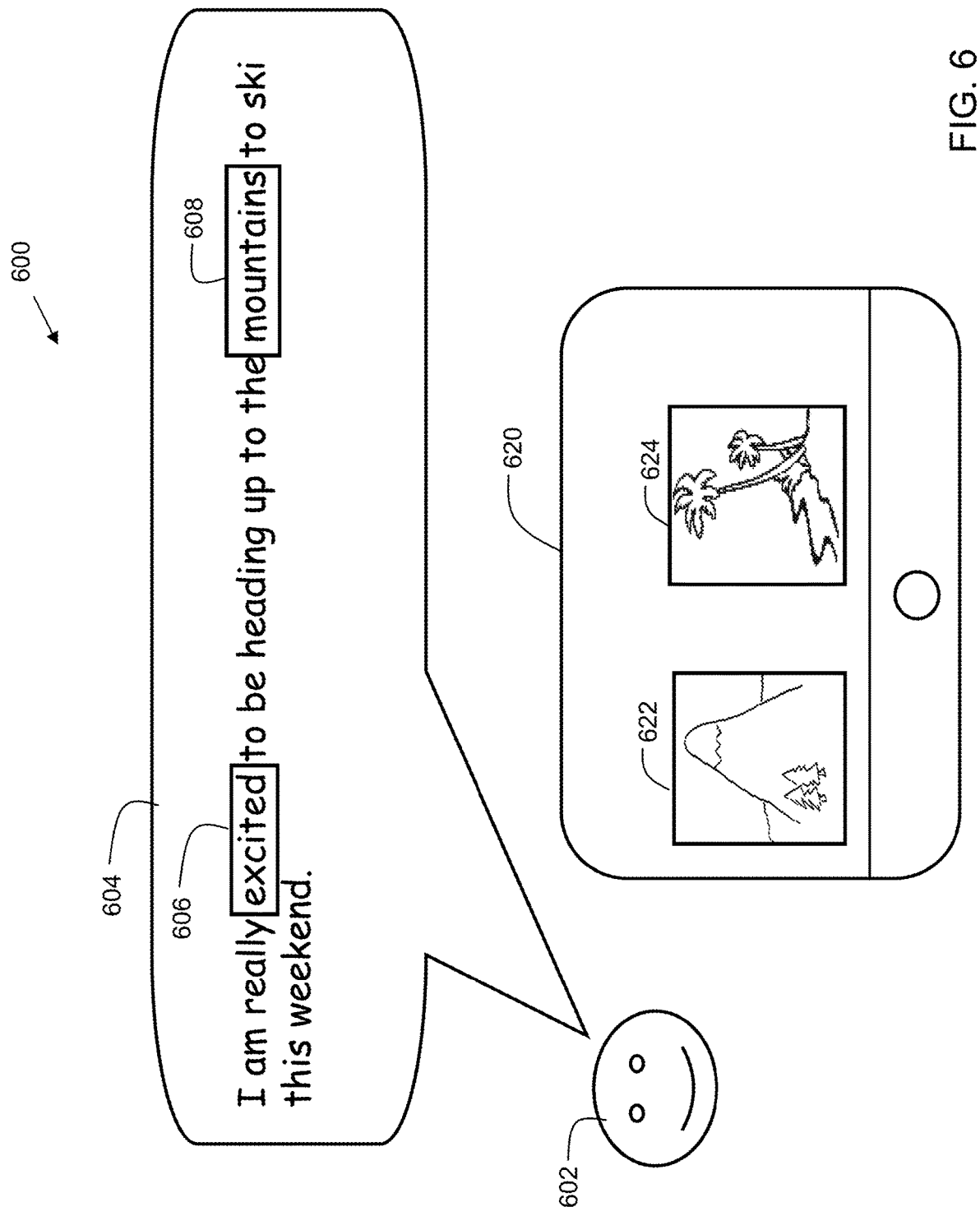
FIG. 6 shows another example usage of an embodiment of the present invention.

FIG. 6 shows another usage example 600 of an embodiment of the present invention. In the example, the user speaks into a microphone similarly to the example of FIG. 5. In the current example, user 602 utters speech fragment 604: "I am really excited to be heading up to the mountains to ski this weekend." Embodiments of the invention extract entities, such as keywords or recognized phrases, from the fragment(s) of speech. Images having metadata matching, or similar to, the extracted entities are fetched and suggested to the user on the user's device screen 620. In the example, the words, "excited" 606 and "mountains" 608 are extracted from the speech fragment. "Excited" is associated with the metadata of "happy". "Happy" is the metadata of a mountain image 622 and beach image 624, so they are suggested. "Mountains" is metadata associated with image 622 of the mountain. So, the image 622 of the mountain is prioritized over the image 624 of the beach since it has two metadata entry matches as opposed to one match of the image 624 of the beach. In this example, the priority is the order that the images are shown in the suggestion. In other examples, priority can be indicated by a border color. For example, prioritized images may have a red border, where other images may have a yellow border or no border. Note that while two images are shown in FIG. 6, in general, embodiments may recommend N images for inclusion, where N can be any number greater than or equal to 1.

Figure 7:
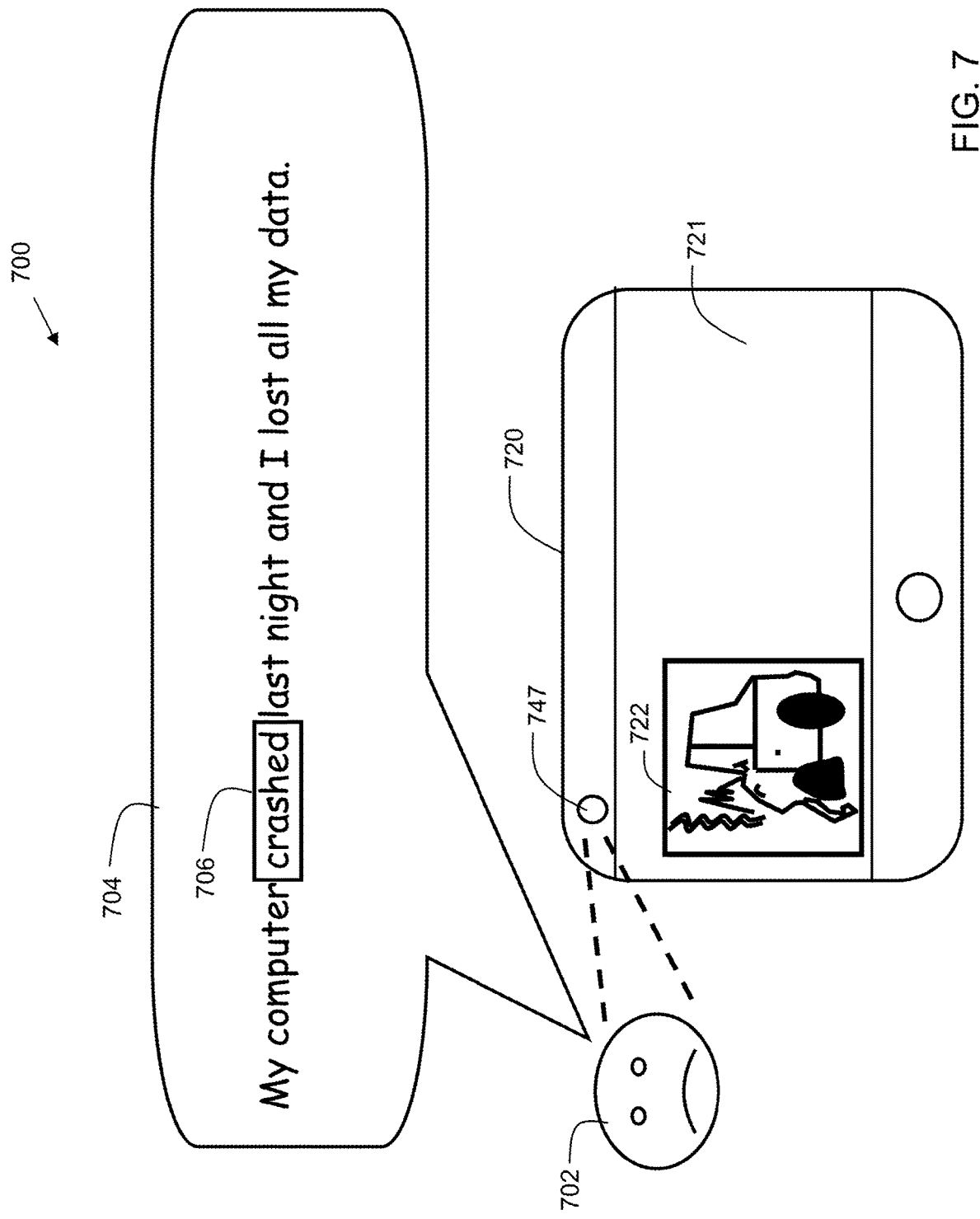
FIG. 7 shows another example usage of an embodiment of the present invention.

FIG. 7 shows yet another usage example 700 of an embodiment of the present invention. A user 702 speaks into a user device, such as device 100 (FIG. 1). In the example, the user 702 speaks into a microphone 114 (FIG. 1) of device 100. The user 702 utters speech fragment 704: "My computer crashed last night and I lost all my data." Embodiments of the invention extract entities, such as keywords or recognized phrases, from the fragment(s) of speech. Images having metadata matching, or similar to, the extracted entities are fetched and suggested to the user on the user's device screen 721 of electronic device 720. In the example, the word, "Crashed" 706 is extracted from the speech fragment. A "crash" is associated with a damaged car, and so an image 722 of a damaged car is suggested. Note that the content of the image does not necessarily need to reflect the literal topic of the speech utterance. In this example, the user is discussing a computer crash, while the system suggests an image of a car crash. Although the image does not show a computer, it reflects the user's sentiment of frustration.

Alternatively, in the example, the image selection may be made based solely on a facial analysis. In this example, the user device may be configured such that the user 702 is looking at the user-facing camera 747 while speaking into a built-in microphone. Alternatively, s/he could be speaking into a microphone remote from the user device, for example, the microphone of a headset plugged into a jack on the phone. Embodiments, using user-facing camera 747, detect facial expressions of the user 702 while s/he is speaking. The detection of facial expressions may be performed by computer-implemented recognition of one or more action units (AUs) from the user based on images acquired from the user-facing camera. From the facial expressions, embodiments associate emotion metadata with the fragment of speech. In the example, image 722 of the damaged car is associated with the emotion "frustrated." Accordingly, image (image) 722 is suggested on user device screen 721.

Figure 8:
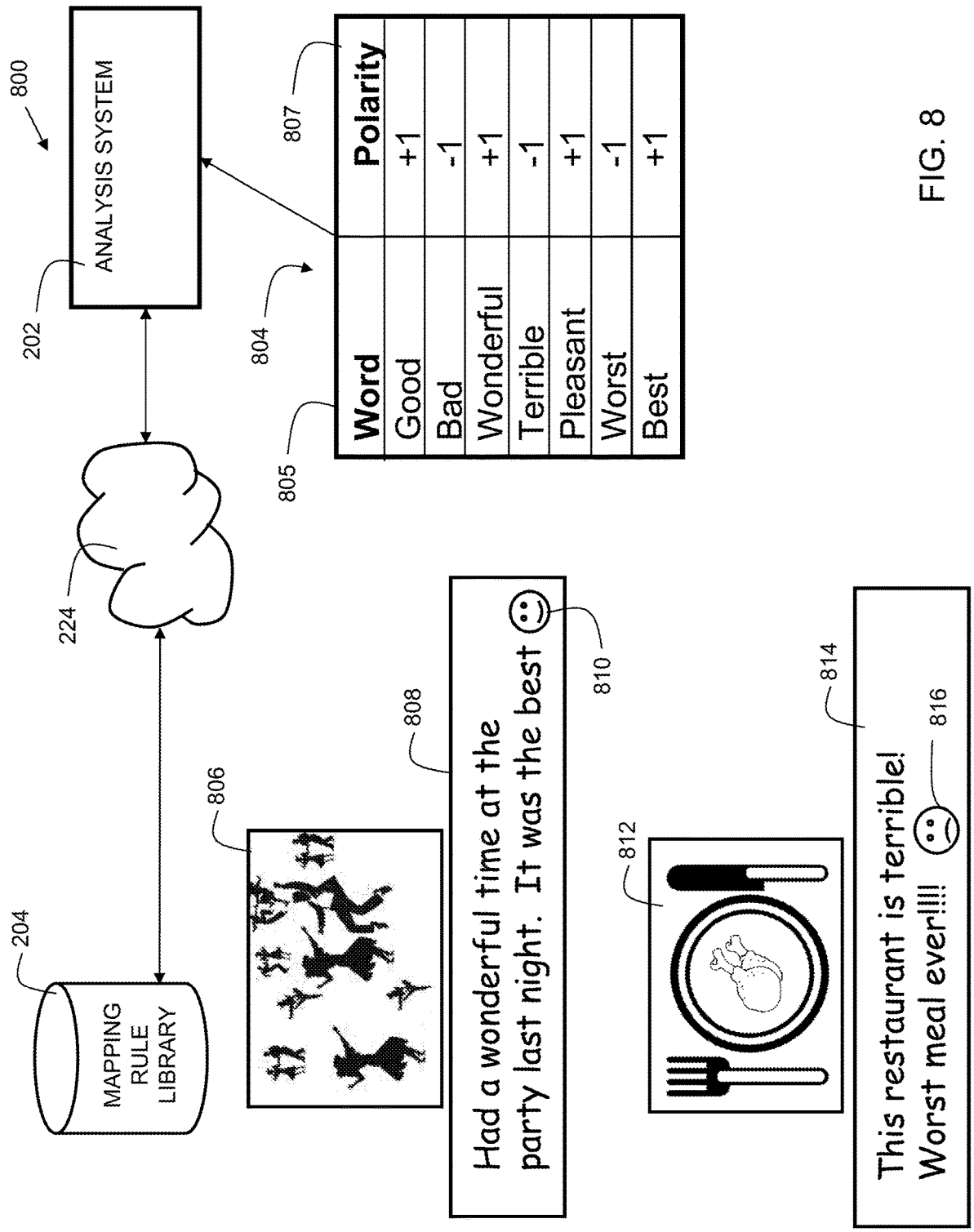
FIG. 8 shows additional details of mapping rule library creation.

FIG. 8 shows additional details of mapping rule library creation. The mapping rule library 204 may be created by performing a "big data" analysis of existing social sharing images. The analysis may include identifying images on social media sites and the corresponding text description of each identified image. A sentiment analysis can be performed on the corresponding text description.

The sentiment analysis may include tokenization, part-of-speech identification, bigram analysis, phrase identification, and/or entity detection. A polarity database 804 may contain a plurality of words and/or phrases associated with positive and/or negative sentiment. Polarity database 804 comprises a Word column 805 and a Polarity column 807. As an example, the word "good" is associated with a positive polarity, and the word "worst" is associated with a negative polarity. A plurality of images available on social media along with a corresponding text description can be analyzed in order to create the mapping rule library. In the example 800, analysis system 202 is analyzing image 806 and image 812. Image 806 has corresponding text description 808, and image 812 has corresponding text description 814. The corresponding text description of each image ingested can be searched for each word and/or phrase in the polarity database. When a word in the polarity database 804 is found in the text description, the polarity of the word is applied to the text description. In the case of text description 808, there are two words from the polarity database, "wonderful" and "best." Each of those words has a positive polarity in the polarity database 804, thus the image 806 is deemed to be associated with positive sentiment. Similarly, in the case of text description 814, there are two words from the polarity database, "terrible" and "worst." Each of those words has a negative polarity in the polarity database 804, thus the image 812 is deemed to be associated with negative sentiment.

The sentiment analysis may further include performing an emoticon analysis. Emoticons can be used as an indication of sentiment. In the case of text description 808, the phrase is terminated with a happy emoticon 810. In the case of text description 814, the phrase is terminated with a sad emoticon 816. The emoticons can be used to further enhance the sentiment analysis.

Using sentiment analysis to analyze many thousands of images in a repository or within a social network, a large mapping rule library can be quickly created. The mapping rule library can be continuously updated as new images are posted to social media websites.

Figure 9:
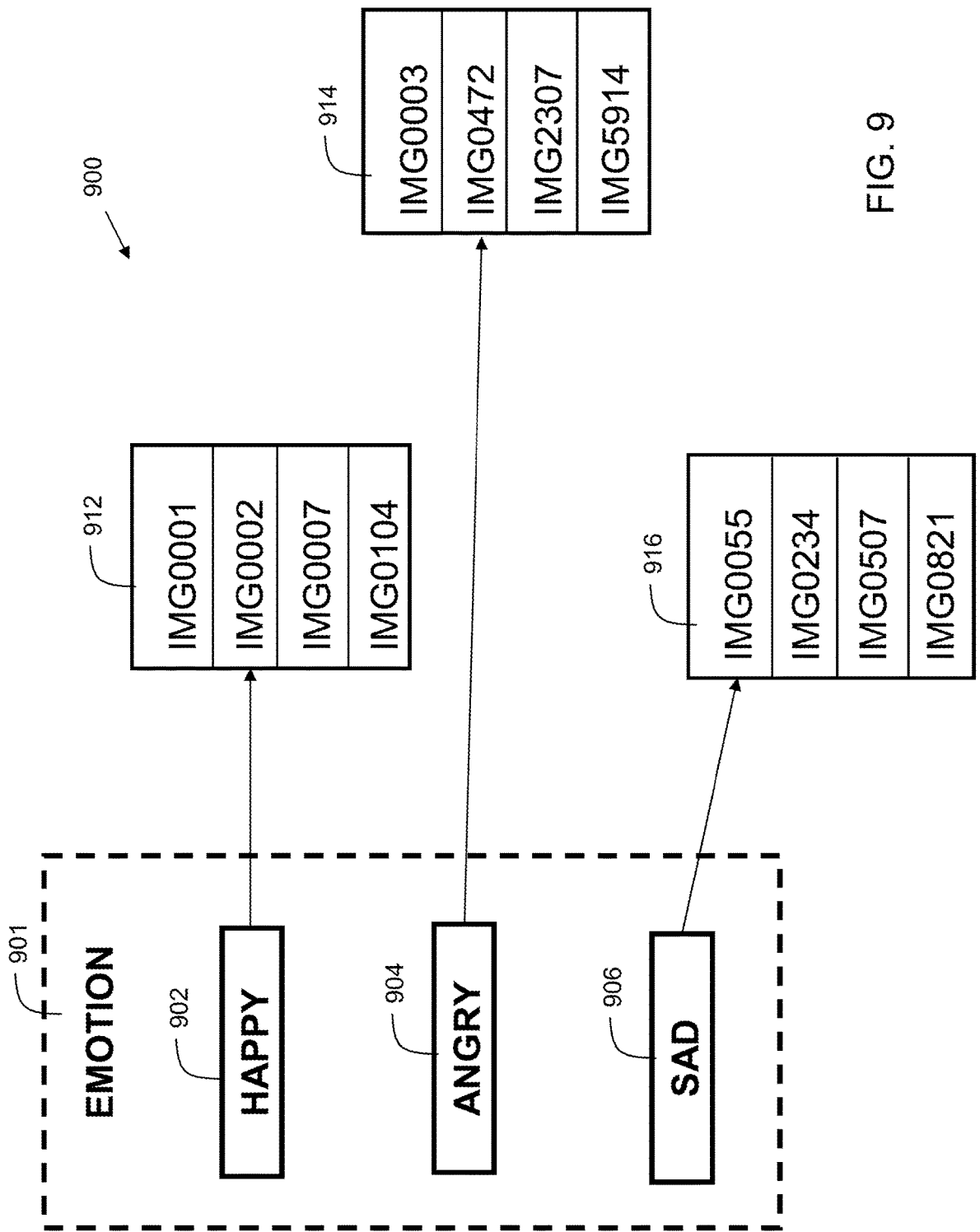
FIG. 9 shows details of an example mapping rule library in accordance with embodiments of the present invention.

FIG. 9 shows details of an example 900 of a mapping rule library in accordance with embodiments of the present invention. In some embodiments, performing the query of the image database comprises performing a key-value pair search in a mapping rule library, wherein the mapping rule library is associated with the image database.

A group of emotion indicators 901 is stored in a database. In the example, the indicators are "Happy" 902, "Angry" 904, and "Sad" 906. The indicator for "Happy" 902 is mapped to a table 912 including four images (images). The images are associated with the following identifiers: IMG0001, IMG0002, IMG0007, and IMG0104. The indicator for "Angry" 904 is mapped to a table 914 including four images. The images are associated with the following identifiers: IMG0003, IMG0472, IMG2307, and IMG5914. The indicator for "Sad" 906 is mapped to a table 916 including four images. The images are associated with the following identifiers: IMG0055, IMG0234, IMG0507, and IMG0821. Note that in embodiments, the images can be images acquired by/and or stored locally in the user's personal electronic device. Additionally, the images can include images posted by others on social media websites or from other sources. Thus, embodiments can provide users with many choices of images to include in their electronic communication.

Figure 10:
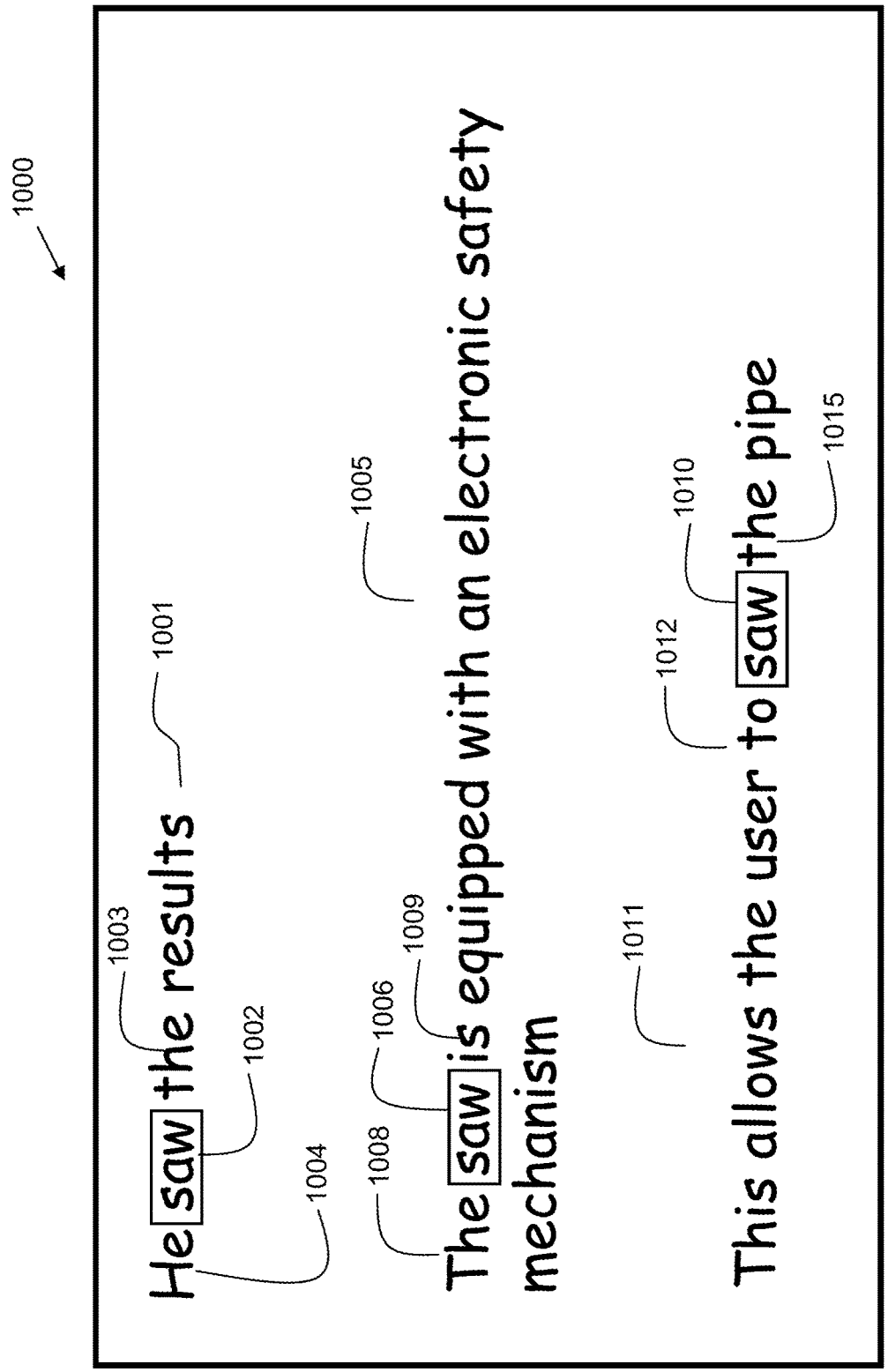
FIG. 10 shows examples of natural language processing used with embodiments of the present invention.

FIG. 10 illustrates an example 1000 showing natural language processing used with embodiments of the present invention. Disambiguation is one of the processes that may be utilized in embodiments of the present invention. As part of content ingest, text may be tokenized into words and tagged with parts of speech. For some words, there can be more than one meaning and/or part of speech. The example 1000 illustrates disambiguation with the word "saw." In phrase 1001, the word "saw" 1002 is a past tense verb. In embodiments, a machine learning natural language analysis module may identify the prior token 1004 to the word saw as a pronoun, and the following token 1003 as an article. In training a classifier, the pattern of pronoun-token-article may be associated with a verb, and thus the token is interpreted as a verb.

In phrase 1005, the word "saw" 1006 is a noun for a cutting tool. In embodiments, a machine learning natural language analysis module may identify the prior token 1008 to the word saw as an article, and the following token 1009 as a verb. In training a classifier, the pattern article-token-verb may be associated with a noun, and thus the token is interpreted as a noun.

In phrase 1011, the word "saw" 1010 is a verb for cutting with a saw tool. In embodiments, a machine learning natural language analysis module may identify the prior token 1012 to the word saw as part of an infinitive form, and the following token 1015 as an article. In training a classifier, the pattern "to"-token-article may be associated with a verb, and thus the token is interpreted as a verb. These classifiers and techniques for disambiguation are merely examples, and other classifiers and techniques are possible. Thus, embodiments include performing a computerized natural language analysis process to derive sentence classifications on the input query by performing a disambiguation process.

As can now be appreciated, disclosed embodiments provide techniques for suggesting images that can be conveniently included in electronic communication such as social media posts, emails, text messages, and other forms of electronic communication, based on voice input and/or emotion analysis from facial expressions of a user. A variety of factors can be used as criteria for suggesting images. Criteria can include mood/emotion of the user, sentiment of the phrase uttered by the user, detected entity/topic information uttered by the user, and/or location of the user, among others. In this way, a user can conveniently compose electronic communication such as emails, text messages, social media posts, and/or blog posts, and be presented with multiple recommended images to select for inclusion in the electronic communication.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for recommending images for inclusion in an electronic message, comprising:
   receiving an uttered phrase from a user, and a face image of the user while the user is speaking the uttered phase, from a client device via a computer network at an analysis server comprising a processor and a memory that stores instructions for the processor, wherein the processor:
   performs a speech-to-text process on the uttered phrase;
   performs an emotion analysis on the face image;
   performs an entity detection process to generate a scenario summary;
   performs a query of an image database using the scenario summary and a result of the emotion analysis as inputs to the query;
   obtains one or more images based on the query and the result; and
   presents the one or more images to a user as available for inclusion in the electronic message.

2. The method of claim 1, wherein performing an emotion analysis comprises identifying one or more action units in the face image.

3. The method of claim 2, wherein the scenario summary comprises an emotion attribute.

4. The method of claim 3, wherein the emotion attribute includes an emotion of joy, sadness, frustration, anger, boredom, or relief.

5. The method of claim 1, wherein performing the query of the image database comprises performing a key-value pair search in a mapping rule library, wherein the mapping rule library is associated with the image database.

6. The method of claim 5, further comprising:
   determining an associated emotion indicator for each image of a plurality of images posted to a social media website; and storing the plurality of images and corresponding emotion indicators in the mapping rule library.

7. The method of claim 6, wherein determining an associated emotion indicator for each image of the plurality of images posted to a social media website comprises performing a polarity analysis on a text description associated with each image of the plurality of images.

8. The method of claim 1, further comprising:
   receiving a location of the user from the client device via the computer network at the analysis server; and
   wherein performing a query of an image database further comprises using the location as an input to the query to obtain the one or more images.

9. The method of claim 1, further comprising:
   receiving a location of the user while the user is speaking the uttered phrase; and
   including an image associated with the location in the presented one or more images.

10. A computer system comprising:
    a processor;
    a memory coupled to the processor, the memory containing instructions, that when executed by the processor, perform the steps of:
    receiving an uttered phrase from a user, and a face image of the user while the user is speaking the uttered phase, from a client device via a computer network;
    performing a speech-to-text process on the uttered phrase;
    performing an emotion analysis on the face image;
    performing an entity detection process to generate a scenario summary;
    performing a query of an image database using the scenario summary and a result of the emotion analysis as inputs to the query;
    obtaining one or more images based on the query and the result;
    providing the one or more images to a user as available for inclusion in an electronic message.

11. The system of claim 10, wherein the memory further comprises instructions, that when executed by the processor, perform the steps of identifying one or more action units in the face image.

12. The system of claim 11, wherein the memory further comprises instructions, that when executed by the processor, perform the step of computing an emotion attribute for the scenario summary.

13. The system of claim 12, wherein the memory further comprises instructions, that when executed by the processor, perform the step of detecting an emotion of joy, sadness, frustration, anger, boredom, or relief.

14. The system of claim 10, wherein the memory further comprises instructions, that when executed by the processor, perform the steps of performing a key-value pair search in a mapping rule library, wherein the mapping rule library is associated with the image database.

15. The system of claim 10, wherein the memory further comprises instructions, that when executed by the processor, perform the steps of:
    receiving a location of the user from the client device via the computer network; and
    using the location as an input to the query to obtain the one or more images.

16. A computer program product for recommending images for inclusion in an electronic message comprising a computer readable storage medium having program instructions embodied therewith, the program instructions executable by a processor to cause the electronic device to:
    receiving an uttered phrase from a user, and a face image of the user while the user is speaking the uttered phase, from a client device via a computer network;
    perform a speech-to-text process on the uttered phrase;
    perform an emotion analysis on the face image;
    perform an entity detection process to generate a scenario summary;
    performing a query of an image database using the scenario summary and a result of the emotion analysis as inputs;
    obtaining one or more images based on the query and the result;
    provide the one or more images to a user as available for inclusion in the electronic message.

17. The computer program product of claim 16, wherein the computer readable storage medium further comprises instructions, that when executed by the processor, perform the step of identifying one or more action units in the face image.

18. The computer program product of claim 17, wherein the computer readable storage medium further comprises instructions, that when executed by the processor, perform the step of computing an emotion attribute for the scenario summary.

19. The computer program product of claim 16, wherein the computer readable storage medium further comprises instructions, that when executed by the processor, perform the step of performing a key-value pair search in a mapping rule library, wherein the mapping rule library is associated with the image database.

20. The computer program product of claim 16, wherein the computer readable storage medium further comprises instructions, that when executed by the processor, perform the steps of:
  receiving a location of the user from the client device via the computer network at an analysis server; and
  using the location as an input to the query to obtain the one or more images.

* * * * *